(12) United States Patent
Hwang et al.

(10) Patent No.: US 8,736,695 B2
(45) Date of Patent: May 27, 2014

(54) PARALLEL IMAGE PROCESSING USING MULTIPLE PROCESSORS

(75) Inventors: Hau Hwang, San Diego, CA (US); Joseph Cheung, San Diego, CA (US); Sergiu R. Goma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 552 days.

(21) Appl. No.: 12/944,971

(22) Filed: Nov. 12, 2010

(65) Prior Publication Data

US 2012/0120256 A1 May 17, 2012

(51) Int. Cl.
*H04N 5/225* (2006.01)
*H04N 5/228* (2006.01)
*G06K 9/60* (2006.01)

(52) U.S. Cl.
USPC .................. 348/218.1; 348/207.1; 348/222.1; 382/304

(58) Field of Classification Search
USPC .................. 348/207.1, 218.1, 222.1; 382/304
See application file for complete search history.

(56) References Cited

U.S. PATENT DOCUMENTS

| | | | |
|---|---|---|---|
| 5,493,643 A * | 2/1996 | Soderberg et al. | 345/505 |
| 5,606,707 A | 2/1997 | Tomassi et al. | |
| 7,071,944 B2 | 7/2006 | MacInnis et al. | |
| 7,254,280 B2 | 8/2007 | Kagle et al. | |
| 7,554,589 B2 * | 6/2009 | Boemler | 348/302 |
| 7,701,506 B2 * | 4/2010 | Silverbrook | 348/222.1 |
| 2001/0036322 A1 | 11/2001 | Bloomfield et al. | |
| 2004/0189819 A1 * | 9/2004 | Saito | 348/222.1 |
| 2005/0041031 A1 | 2/2005 | Diard | |
| 2005/0140786 A1 * | 6/2005 | Kaplinsky | 348/207.1 |
| 2005/0141607 A1 * | 6/2005 | Kaplinsky | 375/240.2 |
| 2008/0137972 A1 | 6/2008 | Yamada et al. | |
| 2009/0262180 A1 * | 10/2009 | Kim et al. | 348/36 |
| 2010/0157090 A1 * | 6/2010 | Kobayashi et al. | 348/222.1 |

FOREIGN PATENT DOCUMENTS

WO 96/39681 12/1996
WO 2006126092 A2 11/2006

OTHER PUBLICATIONS

Vision Systems, "Image Processing: Imaging System Combines Camera Link and GigEVision," www.vision-systems.com, Oct. 2, 2009.
Downton A, et al., "Parallel Architectures for Image Processing", Electronics and Communication Engineering Journal, Institution of Electrical Engineers, London, GB, vol. 10, No. 3, Jun. 1, 1998, pp. 139-151, XP000870533, ISSN: 0954-0695, DOI: 10.1049/ECEJ: 19980307 abstract; figures 3,12,13 p. 140, left-hand column, line 19—p. 141, line 45, last paragraph p. 147, left-hand column, line 7—p. 148, right-hand column, line 32.

(Continued)

*Primary Examiner* — Nhan T Tran
(74) *Attorney, Agent, or Firm* — James R. Gambale, Jr.

(57) ABSTRACT

An electronic device for parallel image processing using multiple processors is disclosed. The electronic device includes multiple image sensors for providing image data. The electronic device also includes multiple processors for processing segmented image data to produce processed segmented image data. Each processor is dedicated to one of the image sensors. A multiple processor interface is also included. The multiple processor interface maps the image data to the processors, segments the image data to produce the segmented image data and synchronizes the segmented image data to processor clock rates.

48 Claims, 9 Drawing Sheets

(56) References Cited

OTHER PUBLICATIONS

Dubois J, et al., "A 10 000 fps CMOS Sensor With Massively Parallel Image Processing", IEEE Journal of Solid-State Circuits, IEEE Service Center, Piscataway, NJ, USA, vol. 43, No. 3, Mar. 1, 2008, pp. 706-717, XP011204862, ISSN: 0018-9200 abstract.

International Search Report and Written Opinion—PCT/US2011/059647—ISA/EPO—Feb. 3, 2012.

* cited by examiner

PARALLEL IMAGE PROCESSING USING MULTIPLE PROCESSORS

TECHNICAL FIELD

The present disclosure relates generally to electronic devices. More specifically, the present disclosure relates to parallel image processing using multiple processors.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform functions faster, more efficiently or with higher quality are often sought after.

Some functions may be data intensive (e.g., image processing), requiring a large amount of processing resources to complete in a desirable amount of time. However, electronic devices such as televisions, smart phones, computers, cameras and music players have processing constraints that determine how quickly they can perform certain functions. Furthermore, some of these electronic devices such as mobile telephones or digital cameras are limited by the amount of power they have stored in a battery. It may be difficult to economically design and manufacture an electronic device that improves processing efficiency and reduces power consumption while providing higher-quality data-intensive functions.

As can be observed from the foregoing discussion, improving the processing capability and/or efficiency of electronic devices may be beneficial. Systems and methods that improve the capability and/or efficiency of electronic devices are disclosed herein.

SUMMARY

An electronic device for parallel image processing using multiple processors is disclosed. The electronic device includes a plurality of image sensors for providing image data and a plurality of processors for processing segmented image data to produce processed segmented image data. Each processor of the plurality of processors is dedicated to one of the plurality of image sensors. The electronic device also includes a multiple processor interface. The multiple processor interface maps the image data to the plurality of processors, segments the image data to produce the segmented image data and synchronizes the segmented image data to clock rates of the plurality of processors.

The electronic device may also include a combining module for combining the processed segmented image data to produce a processed image. At least one processor of the plurality of processors may process segmented image data from at least one image sensor that the at least one processor is not dedicated to. The multiple processor interface may dynamically add processors for image data processing from the plurality of processors. Dynamically adding processors for image data processing may be based on a workload.

The multiple processor interface may determine whether it is beneficial to segment the image data. Each processor may process image data only from an image sensor that each processor is dedicated to if the multiple processor interface determines that it is not beneficial to segment the image data. The multiple processor interface may determine that it is beneficial to segment the image data if the image data can be processed more rapidly if it is segmented. The multiple processor interface may determine that it is beneficial to segment the image data if at least one of the plurality of processors is individually incapable of processing the image data. The multiple processor interface may determine that it is beneficial to segment the image data if the image data can be processed using less power if it is segmented.

The multiple processor interface may determine a mapping to map the image data to the plurality of processors. The multiple processor interface may determine a segmentation of the image data. At least one of the plurality of processors may have a different capability from another of the plurality of processors. At least one of the plurality of image sensors may have a different capability from another of the plurality of image sensors.

The plurality of processors may be individually incapable of processing the image data. Segments of the segmented image data may overlap. The plurality of processors may process the segmented image data in real time and in parallel. The electronic device may be a wireless communication device. The plurality of processors may be image signal processors (ISPs). The electronic device may stream the image data such that the image data is not stored before processing. The combining module may include an output buffer. The combining module may include an output interface and an output buffer.

A method for parallel image processing using multiple processors is also disclosed. The method includes providing image data to an electronic device using a plurality of image sensors and mapping the image data to a plurality of processors. Each processor is dedicated to one of the plurality of image sensors. The method also includes segmenting the image data to produce segmented image data, synchronizing the segmented image data to clock rates of the plurality of processors and processing the segmented image data to produce processed segmented image data.

A computer-program product for parallel image processing using multiple processors is also disclosed. The computer-program product includes instructions on a non-transitory computer-readable medium. The instructions include code for providing image data using a plurality of image sensors and code for mapping the image data to the plurality of processors. Each processor is dedicated to one of the plurality of image sensors. The instructions further include code for segmenting the image data to produce segmented image data, code for synchronizing the segmented image data to clock rates of the plurality of processors and code for processing the segmented image data to produce processed segmented image data.

An apparatus for parallel image processing using multiple processors is also disclosed. The apparatus includes means for providing image data using a plurality of image sensors and means for mapping the image data to the plurality of processors. Each processor is dedicated to one of the plurality of image sensors. The apparatus further includes means for segmenting the image data to produce segmented image data, means for synchronizing the segmented image data to clock rates of the plurality of processors and means for processing the segmented image data to produce processed segmented image data.

DETAILED DESCRIPTION

Figure 1:
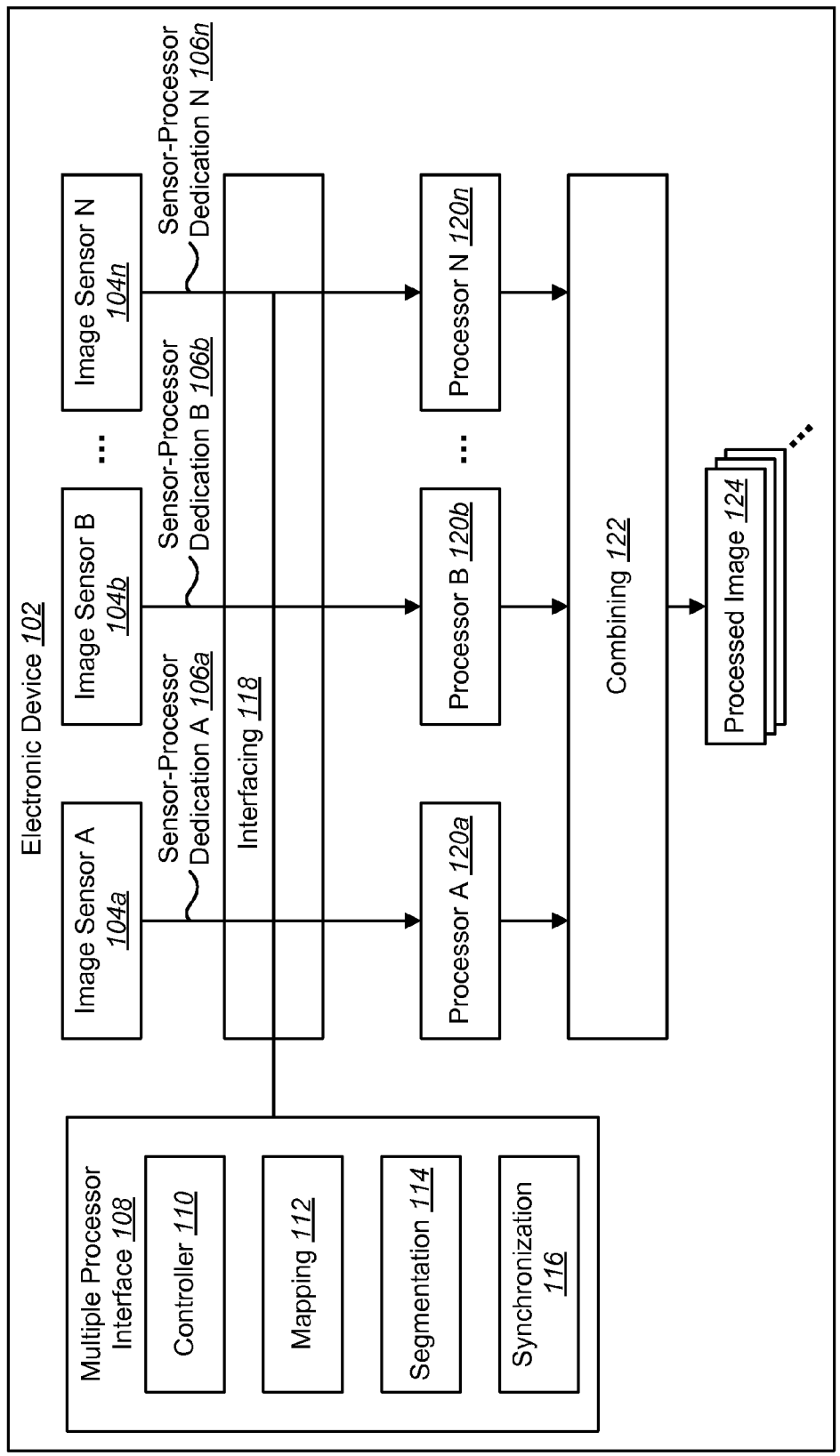
FIG. 1 is a block diagram illustrating one configuration of an electronic device in which systems and methods for parallel image processing using multiple processors may be implemented.

As discussed above, improved capabilities for electronic devices are beneficial and desirable. Specifically, image sensor modules with support for higher Frames Per Second (FPS) processing and/or larger megapixel (MP) sensors are beneficial. For example, larger MP sensors are capable of capturing images with higher resolution or finer detail. Furthermore, higher FPS support in an electronic device enables the capture of smoother video. However, larger MP sensors and/or higher FPS support may require higher processing throughput. For example, the processing throughput for Image Signal Processors (ISPs) may need to increase substantially to support a 30 FPS output rate for 12 MP sensors.

Designing an image signal processor (ISP) with a substantial increase in processing throughput may be time consuming and very costly. The systems and methods disclosed herein, however, allow the combination of two or more "off-the-shelf" image signal processor (ISP) modules to process in parallel in order to achieve the desired throughput. The systems and methods disclosed herein may be especially beneficial since two or more image signal processor (ISP) modules may already be used in some electronic devices. Some of these electronic devices may include two cameras with an image signal processor (ISP) for each camera used for stereo (e.g., for 3-dimensional (3D)) video or for video telephony applications where a main camera and a secondary camera are included. The systems and methods disclosed herein can be used to combine these different camera modules to achieve high processing throughput. That is, an electronic device implementing the systems and methods disclosed herein may dynamically and arbitrarily partition image data for parallel processing. One benefit of this approach is that existing image signal processor (ISP) cores can be used to achieve desired performance without having to re-design a higher throughput pipeline. In one configuration, for example, the systems and methods disclosed herein may be applied such that N processors may be used to process the output of M sensors where M<N.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of an electronic device 102 in which systems and methods for parallel image processing using multiple processors may be implemented. The electronic device 102 includes one or more image sensors 104*a-n* and two or more processors 120*a-n*. The electronic device 102 may include the same or a different number of image sensors 104*a-n* and processors 120*a-n*. Examples of image sensors 104*a-n* include Charge-Coupled Device (CCD) sensors and Complementary Metal Oxide Semiconductor (CMOS) sensors. Examples of processors 120*a-n* include dedicated image signal processors (ISPs) and software implementations of processors. For example, processor A 120*a* is dedicated to image sensor A 104*a*, processor B 120*b* is dedicated to image sensor B 104*b* and so on. That is, image sensor A 104*a* and processor A 120*a* share sensor-processor dedication A 106*a*, image sensor B 104*b* and processor B 120*b* share sensor-processor dedication B 106*b* and so on up to sensor-processor dedication N 106*n* shared by image sensor N 104*n* and processor N 120*n*. Sensor-processor dedication 106*a-n* indicates that when the present systems and methods are not being used, each processor 120*a-n* only processes image data from a particular image sensor 104*a-n* or that each processor 120*a-n* was designed to process image data from a particular image sensor 104*a-n*. For example, image sensor A 104*a* and processor A 120*a* may be manufactured and/or packaged as a single module for use in an electronic device 102. This combined image sensor 104/processor 120 module may be an "off-the-shelf" package, where one or more processors 120*a-n* are dedicated 106 to one or more image sensors 104*a-n*.

As used herein, a "dedicated processor" or a processor with "sensor-processor dedication" may indicate that when the systems and methods herein are not used, the processor only processes image data from a particular image sensor. This processor dedication may include different types of dedication. Inclusive dedication means that a particular processor processes data only from one image sensor, though one or more additional processors may be dedicated to and process image data from that image sensor. These inclusively dedicated processors will only process data from that image sensor when the systems and methods disclosed herein are not used. For example, two processors may each be dedicated to a single image sensor, each processing data from the single image sensor when the systems and methods herein are not used. For instance, dual processors may be specifically designed to process data only from one particular image sensor. Exclusive dedication means that a processor processes only image data from a particular image sensor and is the only processor that processes data from that particular image sensor when the systems and methods herein are not used. As used herein, the terms "dedicated processor," "sensor-processor dedication" and other variations disclose both inclusive dedication and exclusive dedication. In one configuration, the one or more processors 120 are each inclusively dedicated to an image sensor 104. In another configuration, the one or more processors 120 are each exclusively dedicated to an image sensor 104. The systems and methods disclosed herein may be applied to inclusively dedicated processors, exclusively dedicated processors and/or both.

The processors 120a-n perform image processing operations. Examples of image processing operations include cropping, scaling (e.g., to a different resolution), image format conversion, color interpolation, color processing, image filtering (e.g., spatial image filtering), lens artifact or defect correction, etc. Each of the processors 120a-n may have different processing capabilities. For example, processor A 120a may process image data at a higher clock rate than processor B 120b. Similarly, each of the image sensors 104a-n may have different capabilities. For example, image sensor A 104a may provide image data at a higher frame rate and/or resolution than image sensor B 104b.

According to the systems and methods disclosed herein, a multiple processor interface 108 may combine the processing capabilities of two or more processors 120a-n even though the two or more processors 120a-n are dedicated 106a-n to specific image sensors 104a-n. For example, the multiple processor interface 108 may use interfacing 118 to map image data from one or more image sensors 104a-n to one or more processors 120a-n. In some configurations, the multiple processor interface 108 and interfacing 118 are a single module. In other configurations, the multiple processor interface 108 and interfacing 118 are separate. In one configuration, the multiple processor interface 108 and/or interfacing 118 are implemented as hardware components (e.g., switches and/or multiplexers to map image data from one or more image sensors 104a-n to one or more processors 120a-n). In another configuration, the multiple processor interface 108 and/or interfacing 118 are implemented as software (e.g., for addressing or mapping image data from one or more image sensors 104a-n to one or more processors 120a-n). In yet another configuration, the multiple processor interface 108 and/or interfacing 118 is/are implemented as a combination of hardware and software (e.g., used to map image data from one or more image sensors 104a-n to one or more processors 120a-n). Thus, the multiple processor interface 108 and/or interfacing 118 may provide a mapping 112 function.

The multiple processor interface 108 and/or interfacing 118 provide other functionality such as segmentation 114 and synchronization 116. The segmentation module 114 segments image data from one or more image sensors 104a-n. Each image data segment is sent to a processor 120a-n for processing. The synchronization module 116 synchronizes image data rates and processor 120a-n clock rates to enable the processors 120a-n to process segmented images. This enables image processing to occur in parallel and/or in real time. As the processing occurs in real time, the image data or segments may not be stored in a buffer or memory until after processing. That is, the image data and/or image data segments may be continuously streamed in real time until after processing. The image data rates may be the same or different (e.g., for each image sensor 104a-n). Similarly, the processor 120a-n clock rates may be the same or different.

The controller 110 included in the multiple processor interface 108 may be a hardware and/or software module used to control the operations of the multiple processor interface 108 and/or interfacing 118. In one configuration, the controller 110 is implemented as a hardware module for controlling mapping 112, segmentation 114 and/or synchronization 116 functionality. In another configuration, the controller 110 is implemented as a software module, including instructions used to control mapping 112, segmentation 114 and/or synchronization 116. In yet another configuration, the controller 110 module is implemented as a combination of hardware and software.

The controller 110 controls mapping 112, segmentation 114 and/or synchronization 116 functions. For example, the controller 110 may determine how image data from one or more image sensors 104a-n is mapped 112 to one or more processors 120a-n, how image data is segmented 114 and/or how image data rates and processor 120a-n clock rates are synchronized 116. The controller 110 may also determine whether segmentation 114 (e.g., parallel processing) would be beneficial in a particular case. This determination may be based on considerations such as current image sensor 104a-n and processor 120a-n usage, the resolution and/or frame rate of image capture desired, the amount of time needed to process the image data with/without parallel processing, image sensor 104a-n and/or processor 120a-n capabilities and/or power consumption, etc.

The combining module 122 combines processed image data segments (also referred to as "processed image segments" or "processed segments"). The combining module 122 may include an output interface and/or an output buffer. In one configuration, the combining module 122 includes an output interface that combines processed image segments before sending it to the output buffer. In another configuration, the combining module 122 includes an output interface that sends the processed image segments directly to the output buffer. In yet another configuration, the combining module 122 does not include an output interface, but includes an output buffer where the processed image segments are sent from each of the processors 120a-n.

For example, assume that a high resolution image is captured by image sensor A 104a. Also assume that the controller 110 determines that image data segmentation 114 would be beneficial. The mapping module 112 maps the image data to multiple processors 120a-n, which image data is segmented 114 or divided into multiple segments or slices and synchronized 116 to the clock rate of each processor 120a-n. Each processor 120a-n processes its respective segment of the image data and outputs a processed image segment to the combining module 122. The combining module 122 combines the processed image segments to produce a processed image 124. This procedure may be followed to produce multiple processed images 124.

If the electronic device 102 (e.g. controller 110) determines that it would not be beneficial to segment the image data for parallel processing, the electronic device 102 may not map image data to non-dedicated processors 120. In that case, that is, the electronic device 102 may map image data from image sensors 104a-n only to dedicated processors 120 (e.g., perform typical operation). In summary, the processors 120a-n may be used individually (e.g., each processor 120a-n being dedicated to a specific image sensor 104a-n) or may be used in parallel to process an image and achieve a higher throughput. In general, N processors 120a-n may be used, where N≥2. Thus, the image data may be split into N strips (e.g., vertical or horizontal) or regions for parallel real-time processing by the processors 120a-n. In one configuration, image sensors 104 send out image data in a raster scan order. Thus, the image data may be segmented vertically. For example, as the image data is received on a line, a first group of pixels may be sent to one processor and a second group of pixels may be sent to a second processor, etc.

A more specific example of parallel image processing using multiple processors 120 follows. In this example, assume that the electronic device 102 has two processors: processor A 120a and processor B 120b. Also assume that processor B 120b is not dedicated to image sensor A 104a. Image sensor A 104a streams real-time image data into the electronic device 102 (e.g., into the multiple processor interface 108 and/or interfacing 118). The multiple processor interface 108 and/or interfacing 118 streams a left portion (e.g., vertical strip) of the image data to processor A 120*a* while sending a right portion of the image data to processor B 120*b*. In this example, the multiple processor interface 108 and/or interfacing 118 may be implemented as two crop modules, where the first crop module selects pixels (e.g., a first segment) for processor A 120*a* while the second crop module selects pixels (e.g., a second segment) for processor B 120*b*. Processor A 120*a* and processor B 120*b* process the image data segments in real time and in parallel. The combining module 122 may send the processed image segments directly to an output buffer or combine the processed image segments before sending it to the output buffer. Alternatively, the combining module 122 may not include an output interface, in which case the processors 120 directly write the processed image segments to the output buffer.

Figure 2:
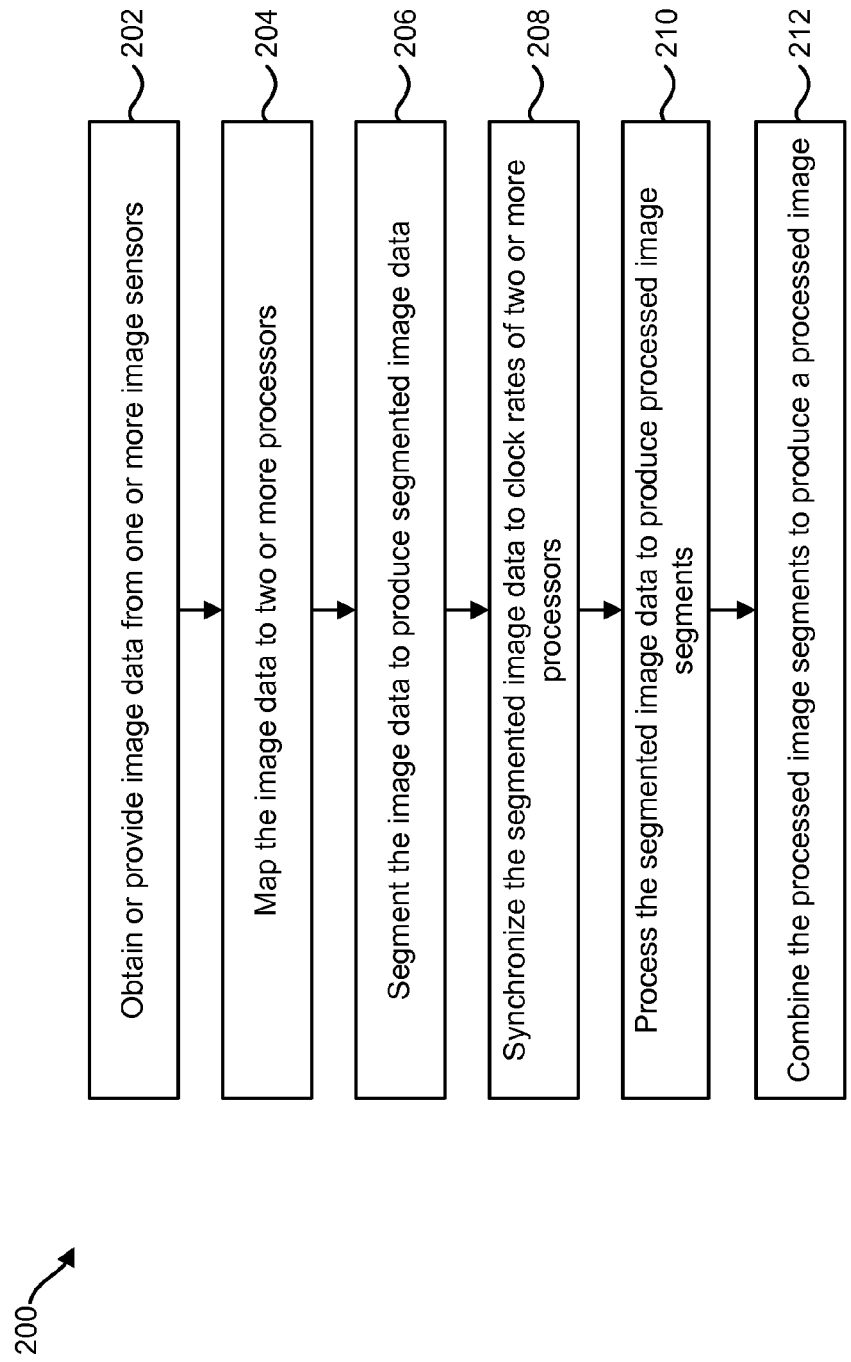
FIG. 2 is a flow diagram illustrating one configuration of a method for parallel processing images using multiple processors.

FIG. 2 is a flow diagram illustrating one configuration of a method 200 for parallel processing images using multiple processors 120. An electronic device 102 obtains 202 image data from one or more image sensors 104. For example, one or more image sensors 104 capture and provide image data. The electronic device 102 maps 204 the image data to two or more processors 120. In one configuration, the multiple processor interface 108 and/or interfacing 118 includes several multiplexers that can be controlled to map 204 the image data to two or more processors 120.

The electronic device 102 segments 206 the image data to produce segmented image data or segments. For example, a controller 110 may control a segmentation 114 module or function that splits or segments 206 the image data. The image data may be segmented 206 into two or more segments. Each image data segment may comprise a number of pixels, for example. The image data segments may be the same size or different sizes. In one configuration, the image data segments include overlapping data (e.g., "pads" or "padding") in order to avoid unwanted artifacts at the "seam(s)" of the segments.

The electronic device 102 synchronizes 208 the image data to the clock rates of two or more processors 120. When the image data is segmented 206, it may be split into two or more image data streams. In order for processing to occur in real time, the electronic device 102 may synchronize 208 the image data streams to the clock rates of the two or more processors 120. This allows processing to proceed in real time. In other words, the image data stream rates may be adjusted to match that of each processor 120. In one configuration, synchronization may be accomplished using First In, First Out (FIFO) buffers. This may allow the image data to be written at one rate by the source (e.g., image sensor 104 data) and read out at a different rate by the sink (e.g., processors 120). The FIFO buffer may be sized to be large enough such that the data rates do not cause overflows in the buffer.

The electronic device 102 processes 210 the segmented image data (also referred to as "image data segments" or "segments") to produce processed image segments (also referred to as "processed segments"). For example, each processor 120 may process 210 an image data segment. As mentioned above, some examples of processing 210 include cropping, scaling, converting image formats, color interpolation, color processing, filtering images (e.g., spatially filtering images), correction for lens artifacts or defects, etc. The processing 210 may occur in parallel and/or in real time. The image data segments may be sent from one or more image sensors 104 (that captured the image data) to one or more processors 120 that are not dedicated to the one or more image sensors 104. In other words, one or more non-dedicated processors 120 may be used in addition to or alternatively from one or more dedicated processors 120 to process the image data segments. Processing 210 the segmented image data produces processed image segments. The electronic device 102 combines 212 the processed image segments in order to produce a processed image 124. The processed image 124 may be displayed, stored and/or transmitted, for example.

Figure 3:
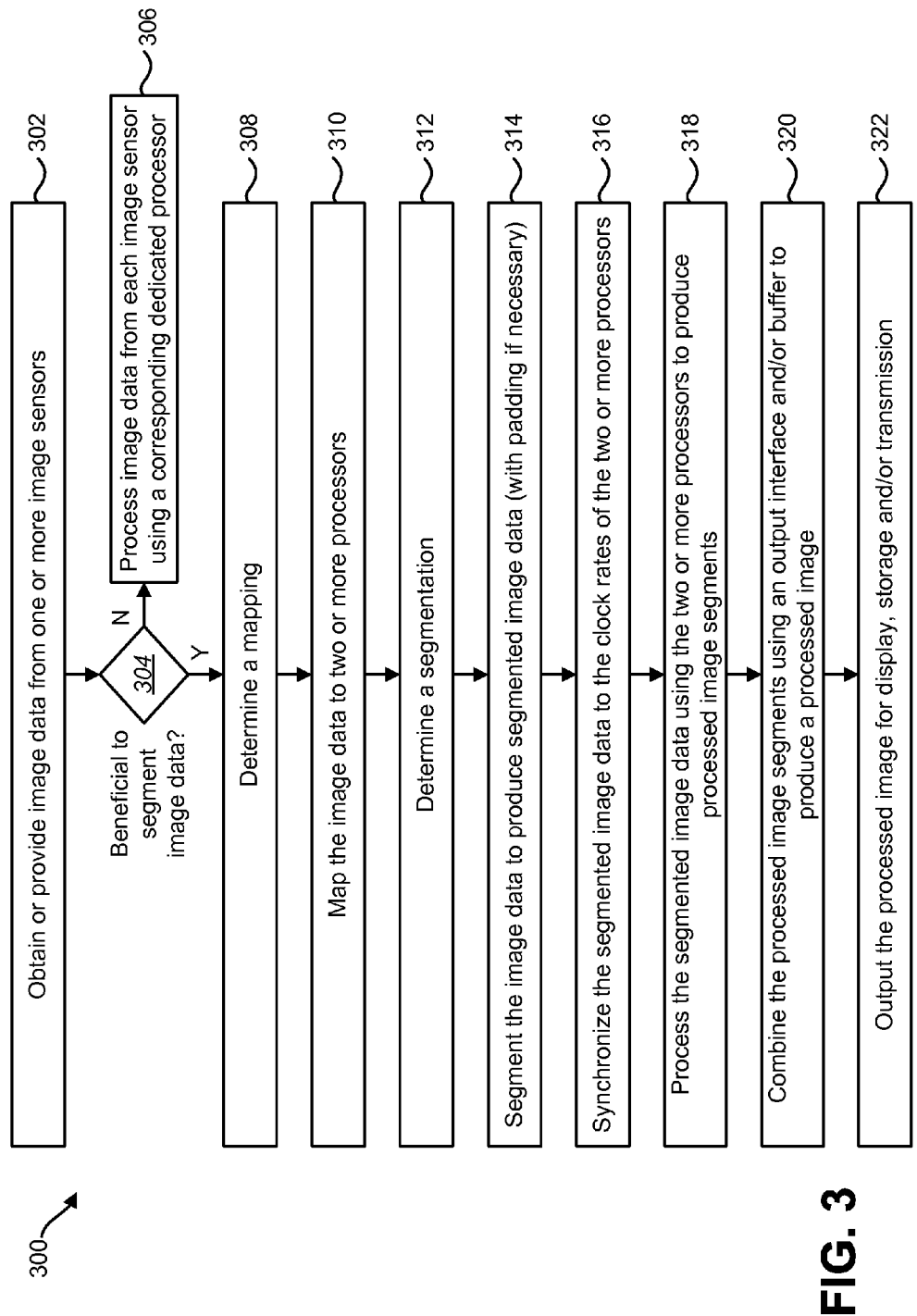
FIG. 3 is a flow diagram illustrating a more specific configuration of a method for parallel image processing using multiple processors.

FIG. 3 is a flow diagram illustrating a more specific configuration of a method 300 for parallel image processing using multiple processors 120. An electronic device 102 obtains 302 image data from one or more image sensors 104. For example, one or more image sensors 104 capture image data and provide the image data to the electronic device 102.

The electronic device 102 may determine 304 whether it would be beneficial to segment the image data for parallel processing. As discussed above, this determination 304 may be based on considerations such as current image sensor 104 and processor 120 usage, the resolution and/or frame rate of image capture desired, the amount of time needed to process the image data with/without parallel processing, image sensor 104 and/or processor 120 capabilities and/or power consumption, etc. In one example, a controller 110 determines whether a dedicated processor 120 alone would be capable of processing the image data within a given amount of time (e.g., at a given resolution and/or frame rate). If the dedicated processor 120 is incapable of processing (or unable to process) the image data within the given amount of time or at a desired frame rate, the controller 110 determines 304 that it would be beneficial to segment the data for parallel processing. In other words, the number of processors 120 used to process the image data may be dynamically adjusted (e.g., added or removed) based on the incoming or current workload (e.g., amount, resolution and/or frame rate of image data).

In another example, the controller 110 bases its determination 304 on current processor 120 usage. Assume that one processor 120 is busy processing video images at a particular frame rate and does not have additional capacity to process a still image. In this case, the controller 110 may determine 304 that it would not be beneficial to segment the image data for parallel processing. Alternatively, the controller 110 may determine 304 that it would be beneficial to segment the image data in this case. For instance, the controller 110 may determine that mapping some of the video processing to another processor 120 and mapping the still image processing to both processors 120 will maintain the video stream and process the still image more quickly than using dedicated processors 120. Thus, the electronic device 102 may dynamically add or group processors 120 for video or image processing when it would be beneficial.

In yet another example, the controller 110 determines 304 that segmenting the image data for parallel processing of an image will be beneficial by conserving power resources (e.g., battery). In this example, assume that a dedicated processor 120 is capable of processing the image in an acceptable amount of time, but doing so will require the dedicated processor 120 to run at a high clock rate, thus dissipating a relatively large amount of power. The controller 110 may determine 304 that segmenting the image data for parallel processing would be beneficial in this case by running two processors 120 at lower clock rates that use less power overall than running the dedicated processor at the high clock rate.

If the electronic device 102 determines 304 that it would not be beneficial to segment the image data for parallel processing, the electronic device 102 may process 306 image data from each image sensor 104 using its dedicated processor(s) 120. For example, the controller 110 may map image data from each image sensor 104 to its dedicated processor(s) 120 and process 306 the image data accordingly.

If the electronic device 102 determines 304 that it would be beneficial to segment the image data for parallel processing, the electronic device 102 may determine 308 a mapping. That is, the controller 110 may determine 308 which processor or processors 120 to map the image data to. In one configuration, the controller 110 determines which (and how many) processors 120 are needed to process the image data at the current resolution and/or frame rate. The mapping determination 308 may be based on considerations such as current image sensor 104 and processor 120 usage, the resolution and/or frame rate of image capture desired, the amount of time needed to process the image data with/without parallel processing, image sensor 104 and/or processor 120 capabilities and/or power consumption, etc.

For example, if a first processor 120 alone or individually is currently incapable of processing the image data at the desired resolution and/or frame rate, the controller 110 may add or map the image data to additional processors 120 until enough processing power is available to process the image data. For instance, the number of processors 120 used to process the image data may be dynamically adjusted (e.g., added or removed) based on the incoming or current workload (e.g., amount, resolution and/or frame rate of image data). Other approaches to determine 308 a mapping may be used. For example, the controller 110 may map the image data to as many processors 120 as possible or to a combination of processors 120 that minimizes power consumption or average processing rate.

In another configuration, the mapping determination 308 may be based on current processor 120 usage or workload. Assume that one processor 120 is busy processing video images at a particular frame rate and does not have additional capacity to process a still image. In this case, a mapping may be determined 308 that maps the still image processing to one or more other processors 120. Alternatively, the mapping may be determined 308 such that some of the video processing is mapped to another processor 120 and the still image processing is mapped to both processors 120 in order to maintain the video stream and process the still image. Thus, the electronic device 102 may map 308 processors 120 for video or image processing.

In yet another example, the mapping is determined 308 based on conserving power resources (e.g., battery). In this example, assume that a dedicated processor 120 is capable of processing the image in an acceptable amount of time, but doing so will require the dedicated processor 120 to run at a high clock rate, thus dissipating a relatively large amount of power. The mapping may be determined 308 such that the image data is mapped to multiple processors 120 running at lower clock rates that use less power overall than running the dedicated processor at the high clock rate.

The electronic device 102 maps 310 the image data to two or more processors 120. For example, the electronic device 102 or controller 110 uses an array of multiplexers, switches and/or other addressing scheme to map or route the image data to two or more processors 120.

The electronic device 102 may determine 312 a segmentation. For example, the electronic device 102 or controller 110 may base the segmentation on processor 120 capacity, speed (or processing rate), current usage, etc. In one simple example, the controller 110 determines 312 a proportionate segmentation based on processor 120 capacity or capability. For instance, assume that one processor 120 has twice the capacity or capability of another processor 120. The controller 110 may segment the image data in a 2:1 ratio, providing twice the number of pixels to one processor 120 compared to the other processor 120. In another example, the controller 110 segments the image data such that up to the maximum processing capacity or capability of each successive processor 120 is used until sufficient processing capacity or capability is allocated to process the image data. It should be noted that the image data may be segmented into vertical strips, horizontal strips and/or other regions that are a subset of the image data. In one configuration, image sensors 104 send out image data in a raster scan order. Thus, the image data may be segmented vertically. For example, as the image data is received on a line, a first group of pixels may be sent to one processor and a second group of pixels may be sent to a second processor, etc.

The segmentation determination 312 may include overlapping image data or "padding." More specifically, if the electronic device 102 (e.g., processors 120) uses filtering (e.g., spatial filtering), then the image data segments sent to the parallel processors 120 will need to take care of seam or edge conditions. This means that overlapping image data segments (e.g., with "padding") may be sent to the parallel processors 120. The amount of overlap may be determined by the amount needed to support spatial or filtering structures in the processing pipeline. For example, assume that a processor 120 uses filtering (e.g., spatial filtering) in the horizontal direction with vertical segmentation. If the electronic device 102 uses a 3×3 filtering kernel, then along each segmentation seam, the left and right segments each need an overlap of one pixel. However, if each of the processors 120 processes the image data on a per-pixel basis, then no overlap may be needed.

The electronic device 102 segments 314 the image data to produce segmented image data (e.g., two or more image data segments). For example, the electronic device 102 or a segmentation module 114 segments 314 the image data according to the segmentation determined 312 by the controller 110. The electronic device 102 may also segment 314 the image data with overlapping segments or padding to avoid edge artifacts at the segment seam(s). The electronic device 102 or segmentation module 114 may segment the image data by discarding or cropping image data that does not correspond to a particular segment or by accepting or receiving image data that corresponds only to a particular segment (with applicable padding or overlap). The electronic device 102 or segmentation module 114 may segment the image data in vertical strips, horizontal strips or other regions, for example.

If the processors 120 utilize per-pixel processing or all processing is done on a per-pixel basis, the image segments sent to the parallel processors 120 may be non-overlapping. In this case, no overlap may be needed because no seams or edge artifacts may result from the processing. However, if the processors 120 utilize filtering (e.g., spatial filtering) in the horizontal direction (e.g., with vertical segments) or vertical direction (e.g., with horizontal segments), then the image segments sent to the parallel processors 120 may need an overlap in image data to properly handle seam or edge conditions (e.g., to avoid artifacts).

The electronic device 102 synchronizes 316 the image data to clock rates of the two or more processors 120. For example, the electronic device 102 or a synchronization module 116 adjusts the rate of the image data stream for an image data segment to match the clock rate of the processor 120 that the image data segment has been mapped 310 to. In one configuration, this may be accomplished using FIFO buffers as described above.

The electronic device 102 processes 318 the segmented image data using the two or more processors 120 to produce processed image segments (e.g., "processed segments"). As discussed above, processing 318 the segmented image data may include cropping, scaling, converting image formats, color interpolation, color processing, filtering images (e.g., spatially filtering images), correction for lens artifacts or defects, etc. Processing 318 the segmented image data yields processed image segments.

The electronic device 102 or combining module 122 combines 320 the processed image segments using an output interface and/or buffer. Combining 320 the processed image segments produces a processed image 124. For example, the electronic device 102 may include an output interface that combines 320 the processed image segments before sending the processed image 124 to an output buffer. In another configuration, an output interface may not be used or needed. In this case, the processors 120 may directly write the processed image segments to the output buffer. Each pipeline (e.g., processor 120) may crop out extra pixels from having overlapped portions or "padding," if any. Alternatively, the combining module 122 (e.g., output interface) may remove extra pixels as it combines 320 the processed image segments. In another configuration, the combining module 122 combines 320 the overlapping pixels with pixels in an adjacent processed segment.

The electronic device 102 may output 322 the processed image 124 for display, storage and/or transmission. For example, the electronic device 102 may store the processed image 124 in memory. Alternatively or in addition, the electronic device 102 may display the processed image 124 and/or transmit the processed image 124 to another device (e.g., another electronic device, wireless communication device, computer, etc.).

Figure 4:
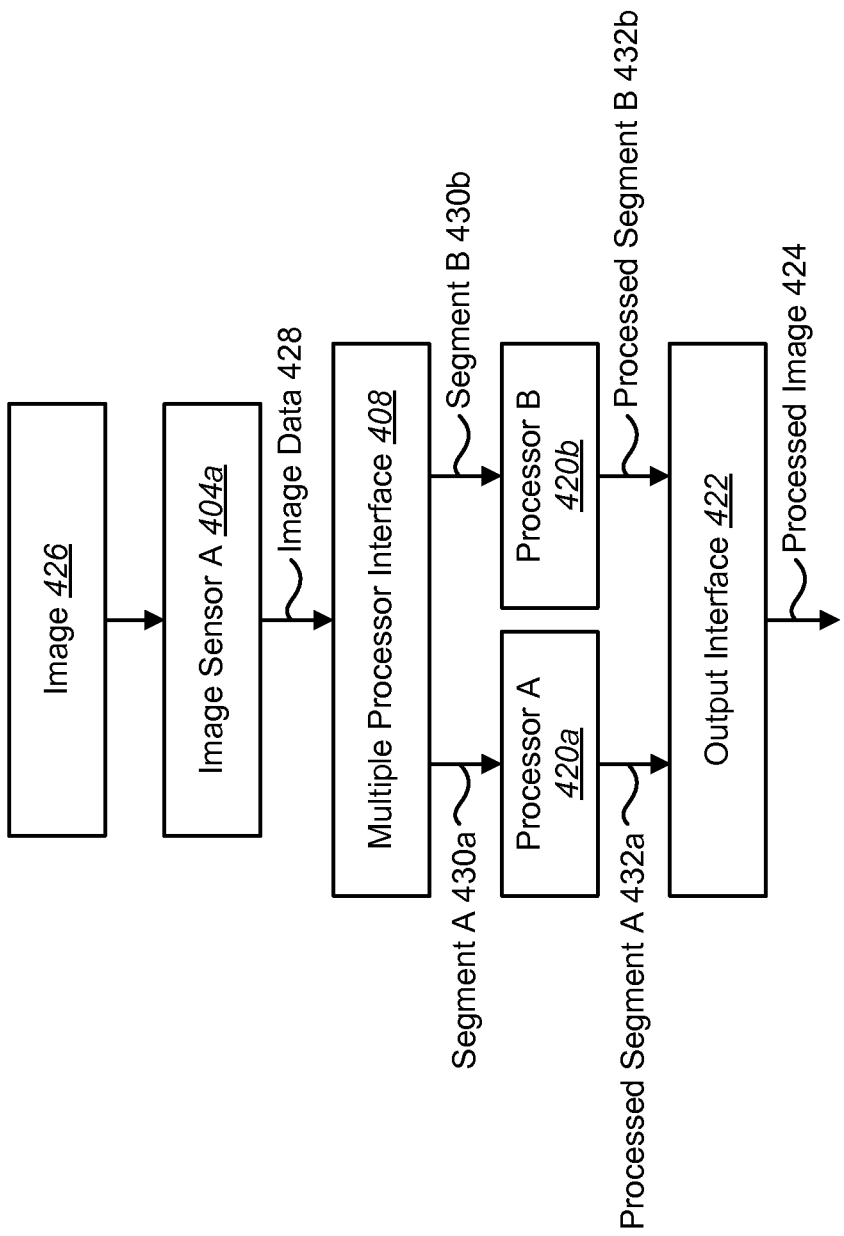
FIG. 4 is a block diagram illustrating one example of parallel image processing using multiple processors.

FIG. 4 is a block diagram illustrating one example of parallel image processing using multiple processors. In this example, image sensor A 404a obtains or captures an image 426. Image sensor A 404a then provides image data 428 to a multiple processor interface 408. The multiple processor interface 408 maps the image data 428 to processor A 420a and processor B 420b and segments the image data 428 into segment A 430a and segment B 430b. The multiple processor interface 408 also synchronizes segment A 430a and segment B 430b with respective processor A 420a and B 420b clock rates. The multiple processor interface 408 provides segment A 430a to processor A 420a and segment B 430b to processor B 420b. Processor A 420a processes segment A 430a to produce processed segment A 432a and processor B 420b processes segment B 430b to produce processed segment B 432b. Processed segment A 432a and processed segment B 432b are provided to the output interface 422. The output interface 422 combines the processed segments A 432a and B 432b to produce the processed image 424.

A more specific example follows. Assume that a 360 megapixels per second (MP/sec) throughput is required to process a 4000×3000 resolution image sensor input at 30 FPS. Assume that the only filtering operation in the pipeline is a 3×3 Finite Impulse Response (FIR) spatial filter. No sensor blanking is assumed in this example. Further assume that processor A 420a is an image signal processor (ISP) with a performance of 260 MP/sec up to 3504 pixel line width. This type of image signal processor (ISP) may be typically used for an 8 MP camera.

The performance that processor B 420b would need to provide in order to process the image data 428 at the current resolution and frame rate may be determined. While processor A 420a can process up to 3504 pixels in a line, it is limited by its processing throughput since 3504*3000*30 FPS is greater than 260 MP/sec. Processor A 420a can only process 4000 pixels*(260 MP/sec)/(360 MP/sec)≈2888 pixel width. Since there is also a 3×3 spatial filter, one extra column of padding is also needed. Thus, segment A 430a (the input to processor A 420a) may be 2888 pixels wide by 3000 pixels high, while processed segment A 432a (the output from processor A 420a) is 2887 by 3000 pixels. Thus, processor B 420b must be able to process 1114 pixels per line=4000−2887+1 padding column. Thus, processor B's 420b throughput must be at least 1114 pixels*3000 pixels*30 FPS≈101 MP/sec. If processor B 420b does not have this performance, one or more processors 420 may be added.

By combining two or more processors, image data from larger resolution sensors can be processed than could be processed by the individual processors. This benefit of the systems and methods disclosed herein is illustrated in Table (1) below. For example, assume that processor A 420a is able to process 5.04 MP images and processor B 420b is able to process 3.15 MP images. According to Table (1), processor A 420a and processor B 420b together could process image data from a 15.27 MP resolution sensor. This is because processor A 420a processes one part of the image data (e.g., a left segment) and processor B 420b processes another part (e.g., a right segment) of the image data. Thus, multiple processors may process image data from high resolution image sensors. In Table (1), "Width" (in pixels) is abbreviated as "W" and "Height" (in pixels) is abbreviated as "H" for convenience.

TABLE 1

| Processor A | | | Processor B | | | | | | | | | | | |
|---|---|---|---|---|---|---|---|---|---|---|---|---|---|---|
| MP | W | H | MP | W | H | MP | W | H | MP | W | H | MP | W | H |
| | | | 1.92 | 1600 | 1200 | 3.15 | 2048 | 1536 | 3.87 | 2272 | 1704 | 5.04 | 2592 | 1944 |
| 1.92 | 1600 | 1200 | 7.08 | 3072 | 2304 | 9.29 | 3520 | 2640 | 10.51 | 3744 | 2808 | 12.39 | 4064 | 3048 |
| 3.15 | 2048 | 1536 | 9.29 | 3520 | 2640 | 11.81 | 3968 | 2976 | 13.18 | 4192 | 3144 | 15.27 | 4512 | 3384 |
| 3.87 | 2272 | 1704 | 10.51 | 3744 | 2808 | 13.18 | 4192 | 3144 | 14.63 | 4416 | 3312 | 16.82 | 4736 | 3552 |
| 5.04 | 2592 | 1944 | 12.39 | 4064 | 3048 | 15.27 | 4512 | 3384 | 16.82 | 4736 | 3552 | 19.17 | 5056 | 3792 |
| 5.95 | 2816 | 2112 | 13.79 | 4288 | 3216 | 16.82 | 4736 | 3552 | 18.45 | 4960 | 3720 | 20.91 | 5280 | 3960 |
| 7.99 | 3264 | 2448 | 16.82 | 4736 | 3552 | 20.16 | 5184 | 3888 | 21.93 | 5408 | 4056 | 24.61 | 5728 | 4296 |
| 9.98 | 3648 | 2736 | 19.66 | 5120 | 3840 | 23.25 | 5568 | 4176 | 25.16 | 5792 | 4344 | 28.02 | 6112 | 4584 |
| 12.00 | 4000 | 3000 | 22.46 | 5472 | 4104 | 26.28 | 5920 | 4440 | 28.31 | 6144 | 4608 | 31.34 | 6464 | 4848 |
| 13.33 | 4216 | 3162 | 24.27 | 5688 | 4266 | 28.24 | 6136 | 4602 | 30.34 | 6360 | 4770 | 33.47 | 6680 | 5010 |
| 15.93 | 4608 | 3456 | 27.72 | 6080 | 4560 | 31.96 | 6528 | 4896 | 34.19 | 6752 | 5064 | 37.51 | 7072 | 5304 |
| 16.82 | 4736 | 3552 | 28.90 | 6208 | 4656 | 33.23 | 6656 | 4992 | 35.50 | 6880 | 5160 | 38.88 | 7200 | 5400 |
| 21.68 | 5376 | 4032 | 35.17 | 6848 | 5136 | 39.92 | 7296 | 5472 | 42.41 | 7520 | 5640 | 46.10 | 7840 | 5880 |

It should be noted that image signal processors (e.g., processors 420) may be limited by the width of the image they can process. For example, processor A 420a with a width of 1600 and processor B 420b with a width of 2048 may process an image that has a width of almost 1600+2048, which is approximately 9 MP. In Table (1), the combined widths are not illustrated as a simple sum of widths to account for some padding, which has been set to 128 in this example. More specifically, the combination of processor A 420a width of 1600 and processor B 420b width of 2048 would sum to 3648, but is illustrated with a width of 3520 to account for padding. It should also be noted that the heights illustrated are determined assuming a picture aspect ratio of 4:3, which may be typical for image sensors.

Figure 5:
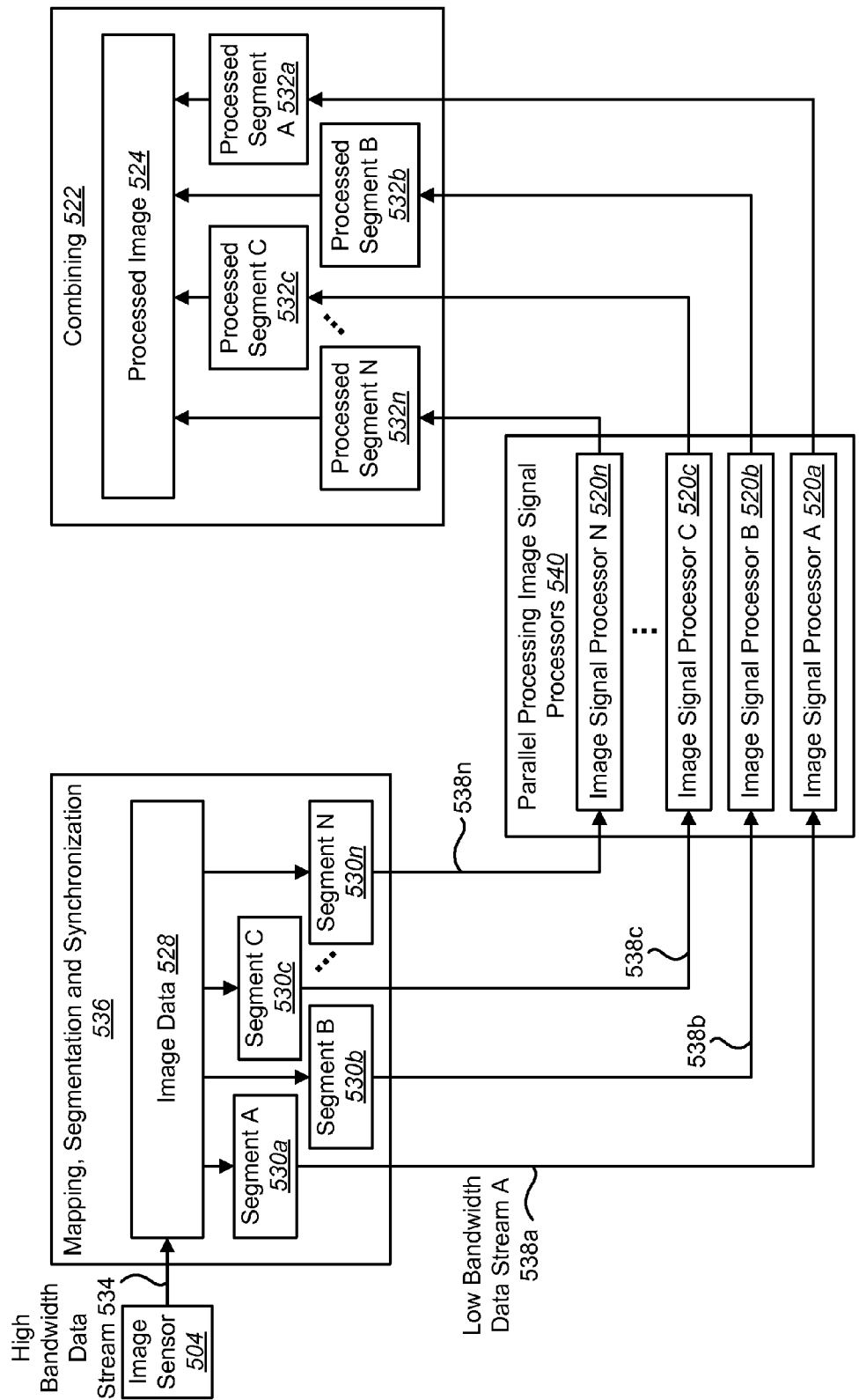
FIG. 5 is a block diagram illustrating another example of parallel image processing using multiple processors.

FIG. 5 is a block diagram illustrating another example of parallel image processing using multiple processors. More specifically, FIG. 5 illustrates a single image sensor 504/multiple image signal processor 520 case. An image sensor 504 captures or obtains image data 528. In this example, the image sensor 504 provides image data 528 as a single high-bandwidth data stream 534 to a mapping, segmentation and synchronization module 536. The mapping, segmentation and synchronization module 536 maps the image data 528 to multiple processors 520a-n, segments the image data 528 into segment A 530a, segment B 530b, segment C 530c and so on, up to segment N 530n. That is, the image data 528 is segmented into two or more segments 530. Each segment 530 is provided to parallel processing image signal processors 540 as a low bandwidth data stream 538a-n. Thus, multiple low bandwidth data streams 538a-n are sent to parallel processing image signal processors 540. More specifically, segment A 530a is provided to image signal processor A 520a as low bandwidth data stream A 538a, segment B 530b is provided to image signal processor B 520b as low bandwidth data stream B 538b, segment C 530c is provided to image signal processor C 520c as low bandwidth data stream C 538c and so on up to segment N 530n being provided to image signal processor N 520n as low bandwidth data stream N 538n. The data mapping, segmentation and synchronization module 536 also synchronizes each low bandwidth data stream 538a-n to the respective clock rate of each image signal processor 520a-n. As illustrated in FIG. 5, the systems and methods disclosed herein provide data rate reduction through parallel processing using multiple processors.

Each of the image signal processors 520a-n provides a processed segment 532a-n to a combining module 522. The combining module 522 combines the processed image segments A-N 532a-n into a processed image 524. As illustrated by the example in FIG. 5, image processing may be accomplished in parallel and in real time according to the systems and methods disclosed herein.

Figure 6:
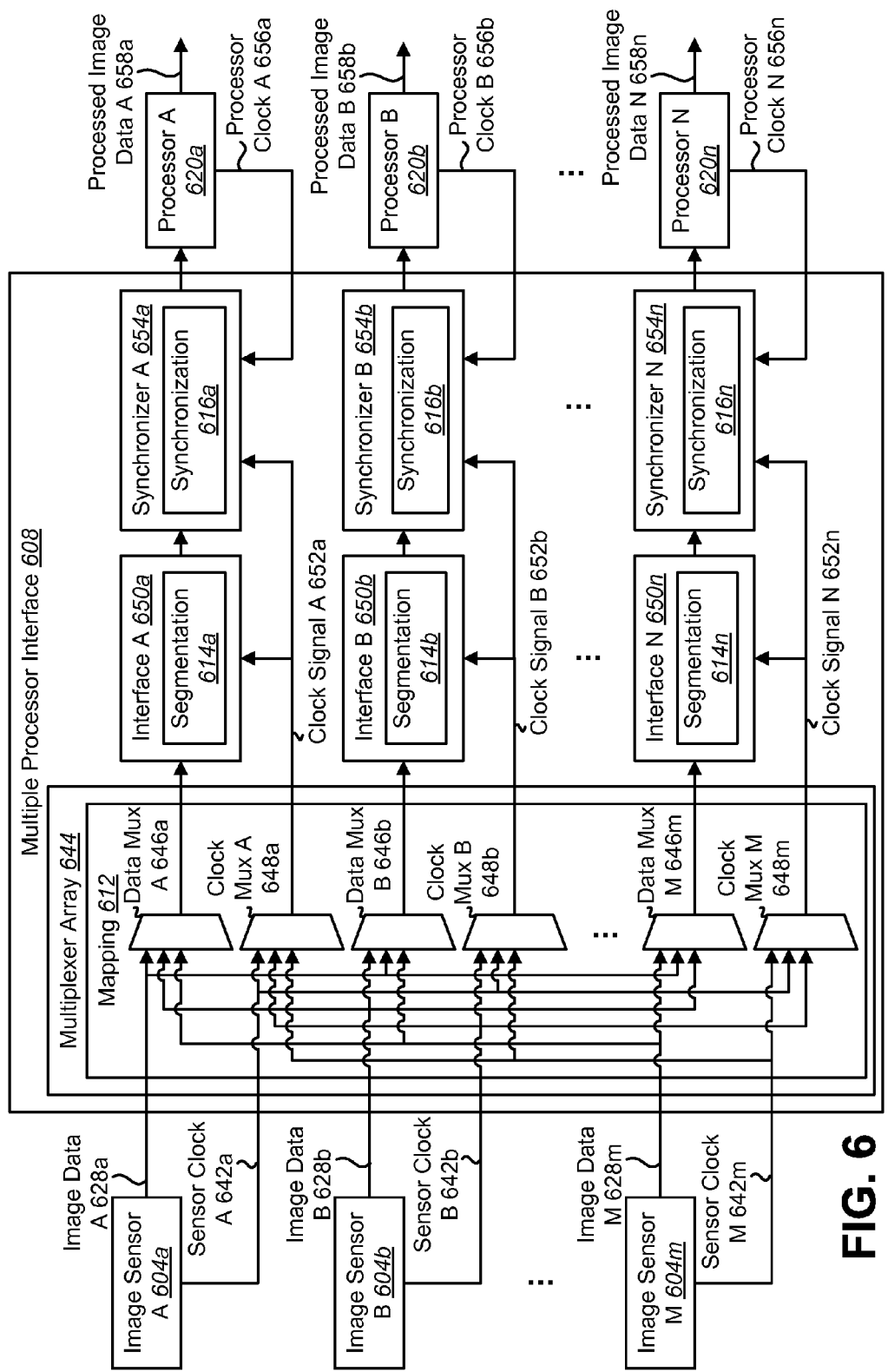
FIG. 6 is a block diagram illustrating more detail for one configuration of a multiple processor interface.

FIG. 6 is a block diagram illustrating more detail for one configuration of a multiple processor interface 608. One or more image sensors 604a-m may be coupled to a multiple processor interface 608. The multiple processor interface 608 may be coupled to two or more processors 620a-n. The multiple processor interface 608 may be implemented as a hardware and/or software module. For example, the multiple processor interface 608 may be implemented as an Integrated Circuit (IC) including components used to implement the systems and methods disclosed herein. Alternatively, the multiple processor interface 608 may be implemented as a software module including instructions or code used to implement the systems and methods disclosed herein. Alternatively, the multiple processor interface 608 may be implemented as a combination of hardware and software. Thus, the multiple processor interface 608 is described in terms of functionality.

The multiple processor interface 608 may include a multiplexer array 644, two or more interface modules 650a-n and two or more synchronizers 654a-n. The multiplexer array 644 may provide mapping 612 functionality. For example, the multiplexer array 644 may include one or more data multiplexers (labeled "Data Mux" in FIG. 6 for convenience) 646a-m and one or more clock multiplexers 648a-m (labeled "Clock Mux" in FIG. 6 for convenience). The data multiplexers 646a-m map image data 628a-m to the two or more processors 620a-n. More specifically, the data multiplexers 646a-m may map image data 628a-m from any of the one or more image sensors 604a-m to any of the two or more processors 620a-n.

The clock multiplexers 648a-m are used to map sensor clock signals 642a-m to the interface modules 650a-n and to the synchronizer modules 654a-n. The sensor clock signals 642a-m may indicate a frame rate or rate at which image data 628a-m is being captured. In other words, the clock multiplexers 648a-m may map the sensor clock signals 642a-m to the interface blocks 650a-n and the synchronizers 654a-n as clock signals 652a-n. For example, sensor clock B 642b may be mapped to interface A 650a and synchronizer A 654a as clock signal A 652a.

The interface modules 650a-n provide segmentation 614a-n functionality. For example, the interfaces 650a-n may be implemented as "croppers" that segment the image data 628a-m from the image sensors 604a-m. The interface modules 650a-n may use the clock signals 652a-n. For example, the interface modules 650a-n may be implemented in hardware, such that the clock signals 652a-n are used to run the circuits. The sensor clocks 642a-m may be synchronized (respectively, for example) with the image data 628a-m. Thus, the clock signals 652a-n may allow the hardware to be timed such that each cycle corresponds to each data element from the image sensors 604. In this way, the interface modules 650a-n may "understand" when data is delivered and the timing of the data. The timing of the data may be used to synchronously drive logic that used for operations like cropping. Generally, the clock signals 652a-n may provide one or more timing signals for segmentation logic to understand when valid data is delivered to it from the image sensors 604a-m.

The interface modules 650a-n provide the segmented image data to the synchronizers 654a-n. The synchronizers 654a-n provide synchronization 616a-n functionality. The synchronizers 654a-n may use the clock signals 652a-n and the processor clock signals 656a-n in order to synchronize the segmented image data to the clock domain of the processors 620a-n. In this way, the segmented image data may be processed in parallel and in real time by the processors 620a-n. In one configuration, each processor 620a-n runs at a different clock rate. Thus, synchronizing 616a-n the segmented image data into the clock domain of each processor 620a-n may be needed to coordinate the proper processing of each image segment. As illustrated in FIG. 6, each processor 620a-n outputs processed image data 658a-n. It should be noted that according to the systems and methods herein, there may be a different number of image sensors 604a-m than processors 620a-n. Alternatively, there may be the same number of image sensors 604a-m as processors 620a-n.

Figure 7:
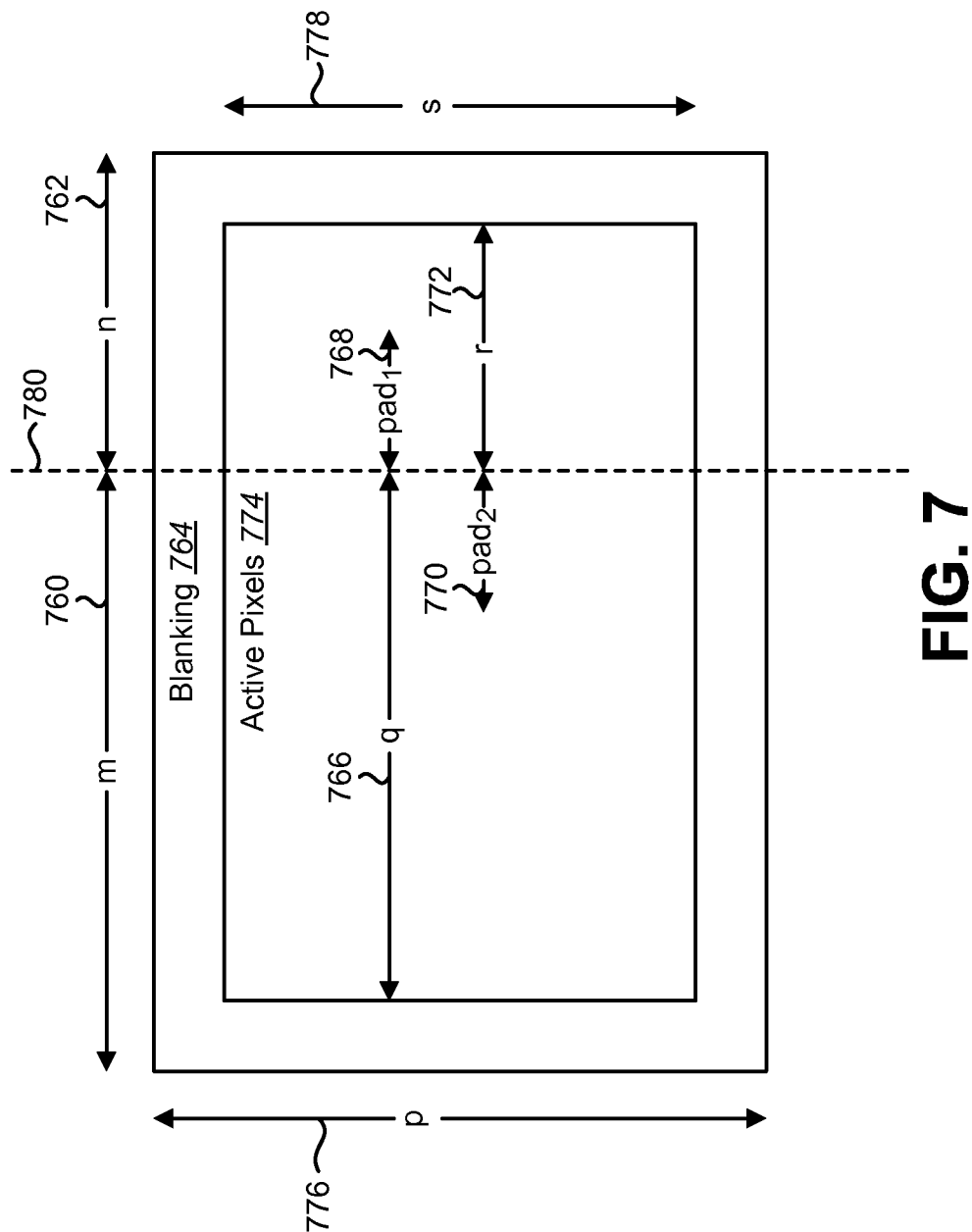
FIG. 7 is a diagram illustrating one example of image data segmentation.

FIG. 7 is a diagram illustrating one example of image data segmentation. Specifically, vertical segmentation of image data for processing using two processors 120 is illustrated. Active pixels 774 and blanking 764 are two regions of image data provided by an image sensor 104. Active pixels 774 are pixels in the image data used to produce an image. In other words, the active pixels 774 are pixels to be processed in order to produce a processed image 124. Blanking 764 is a region surrounding the active pixels 774. The blanking region 764 may comprise a region that is not part of the active pixel region 774. For example, the image sensor 104 may or may not send blanking region 764 pixels. For instance, the blanking region 764 may be used in between frames and/or between the lines in within a frame to provide image sensor 104 circuitry with a number of cycles to finish its work and prepare for handling the next segment of data. During this time, there may not be any valid data to be presented, thus resulting in a blanking region 764.

In FIG. 7, several letters represent various dimensions of image data. More specifically, m 760 represents the horizontal dimension of a first segment including blanking 764, n 762 represents the horizontal dimension of a second segment including blanking 764, p 776 represents the vertical dimension of the active pixels 774 and blanking 764, q 766 represents the horizontal dimension of a first segment of active pixels 774, r 772 represents the horizontal dimension of a second segment of active pixels and s 778 represents the vertical dimension of active pixels 774. In this example, image data from one image sensor 104 is segmented into two segments for processing on two processors 120. According to the example, assume that the image sensor 104 has a resolution (e.g., in pixels) as illustrated in Equation (1).

$$\text{Sensor\_Resolution} = (q+r)*s \quad (1)$$

An image data input rate may be defined as illustrated in Equation (2).

$$\text{Input\_Rate} = (m+n)*p*\text{fps} \quad (2)$$

In Equation (2), fps is a frame rate (e.g., in FPS). The Input_Rate is the rate at which image data is input into a multiple processor interface 108 from the image sensor 104.

In this example, the image data is segmented into two segments by a seam 780. The first segment (of active pixels 774) has dimensions of q 766 by s 778. However, a first pad with dimensions $pad_1$ 768 by s 778 may also be processed by the first processor 120. Thus, the input resolution of the first processor 120 is illustrated in Equation (3).

$$\text{Input\_Resolution}_1 = (q+pad_1)*s \quad (3)$$

Accordingly, the first processor 120 has a processing rate as illustrated in Equation (4).

$$\text{Processing\_Rate}_1 \geq (m+pad_1)*p*\text{fps} \quad (4)$$

And, the output resolution of the first processor 120 is illustrated in Equation (5).

$$\text{Output\_Resolution}_1 = q*s \quad (5)$$

Similarly, the input resolution, processing rate and output resolution of the second processor 120 are given in Equations (6), (7) and (8), respectively.

$$\text{Input\_Resolution}_2 = (r+pad_2)*s \quad (6)$$

In Equation (6), $\text{Input\_Resolution}_2$ is the input resolution of the second processor 120 and $pad_2$ 770 is the horizontal dimension of a second pad. It should be noted that the sizes of $pad_1$ and $pad_2$ may be determined by the amount of padding needed to avoid artifacts at the seam 780 as discussed above.

$$\text{Processing\_Rate}_2 \geq (n+pad_2)*p*\text{fps} \quad (7)$$

In Equation (7), $\text{Processing\_Rate}_2$ is the processing rate of the second processor 120. Equation (8) illustrates the output resolution of the second processor 120 ($\text{Output\_Resolution}_2$).

$$\text{Output\_Resolution}_2 = r*s \quad (8)$$

Figure 8:
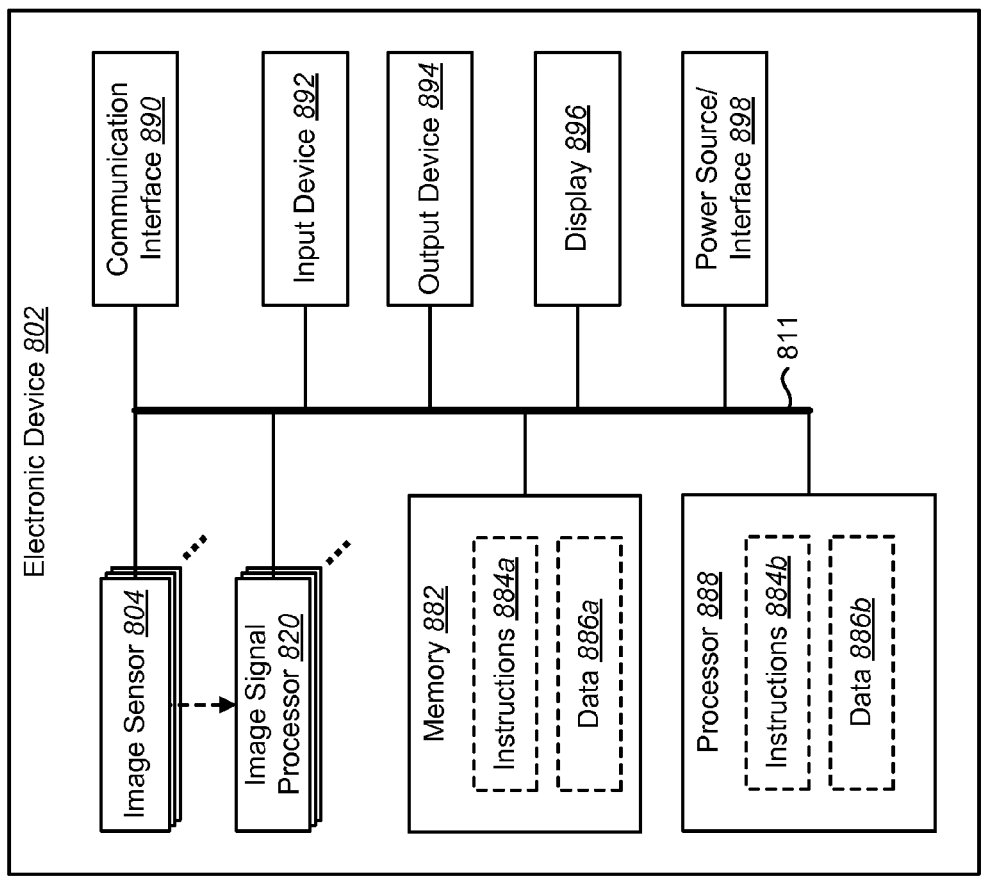
FIG. 8 illustrates various components that may be utilized in an electronic device.

FIG. 8 illustrates various components that may be utilized in an electronic device 802. The illustrated components may be located within the same physical structure or in separate housings or structures. The electronic device 102 discussed in relation to FIG. 1 may be configured similarly to the electronic device 802. The electronic device 802 includes one or more image sensors 804. The one or more image sensors 804 may be one or more devices that capture or convert an optical signal (e.g., image) into an electronic signal or image data. Examples of image sensors 804 include Charge-Coupled Device (CCD) and Complementary Metal Oxide Semiconductor (CMOS) sensors.

The electronic device 802 includes two or more image signal processors 820. The two or more image signal processors 820 may be directly and/or indirectly coupled to the one or more image sensors 804. The two or more image signal processors 820 may be general purpose single- or multi-chip microprocessors (e.g., ARMs), special purpose microprocessors (e.g., digital signal processors (DSPs)), microcontrollers, programmable gate arrays, etc. The two or more image signal processors 820 may be used to perform image processing functions. For example, the two or more image signal processors may perform cropping, scaling (e.g., to a different resolution), image format conversion, color interpolation, color processing, image filtering (e.g., spatial image filtering), lens artifact or defect correction, etc.

The electronic device 802 includes a processor 888. The processor 888 may be a general purpose single- or multi-chip microprocessor (e.g., an ARM), a special purpose microprocessor (e.g., a digital signal processor (DSP)), a microcontroller, a programmable gate array, etc. The processor 888 may be referred to as a central processing unit (CPU). Although just a single processor 888 is shown in the electronic device 802 of FIG. 8, in an alternative configuration, a combination of processors (e.g., an ARM and DSP) could be used.

The electronic device 802 also includes memory 882 in electronic communication with the processor 888. That is, the processor 888 can read information from and/or write information to the memory 882. The memory 882 may be any electronic component capable of storing electronic information. The memory 882 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 886a and instructions 884a may be stored in the memory 882. The instructions 884a may include one or more programs, routines, sub-routines, functions, procedures, etc. The instructions 884a may include a single computer-readable statement or many computer-readable statements. The instructions 884a may be executable by the processor 888 to implement the methods that were described above. Executing the instructions 884a may involve the use of the data 886a that is stored in the memory 882. FIG. 8 shows some instructions 884b and data 886b being loaded into the processor 888.

The electronic device 802 may also include one or more communication interfaces 890 for communicating with other electronic devices. The communication interfaces 890 may be based on wired communication technology, wireless communication technology, or both. Examples of different types of communication interfaces 890 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter and so forth.

The electronic device 802 may also include one or more input devices 892 and one or more output devices 894. Examples of different kinds of input devices 892 include a keyboard, mouse, microphone, remote control device, button, joystick, trackball, touchpad, lightpen, etc. Examples of different kinds of output devices 894 include a speaker, printer, etc. One specific type of output device that may be typically included in an electronic device 802 is a display device 896. Display devices 896 used with configurations disclosed herein may utilize any suitable image projection technology, such as a cathode ray tube (CRT), liquid crystal display (LCD), light-emitting diode (LED), gas plasma, electroluminescence, or the like. A display controller (not shown) may also be provided for converting data stored in the memory 882 into text, graphics and/or moving images (as appropriate) shown on the display device 896.

The electronic device 802 may also include a power source and/or interface 898. The power source and/or interface 898 may provide electrical power to the electronic device 802. For example, the power source/interface 898 may be a battery. Alternatively, the power source/interface may be a port through which electrical power may be provided. For example, the power source/interface 898 may be a port that accepts Alternating Current (AC) or Direct Current (DC) power. In one configuration, the power source/interface 898 is used to accept a power adapter that plugs into a power outlet. Alternatively, the power source/interface 898 may accept electrical power via a USB port. In yet another configuration, the power source/interface 898 wirelessly receives electrical power (e.g., using an inductive or proximity charging device).

The various components of the electronic device 802 may be coupled together by one or more buses, which may include a power bus, a control signal bus, a status signal bus, a data bus, etc. For simplicity, the various buses are illustrated in FIG. 8 as a bus system 811. It should be noted that FIG. 8 illustrates only one possible configuration of an electronic device 802. Various other architectures and components may be utilized.

Figure 9:
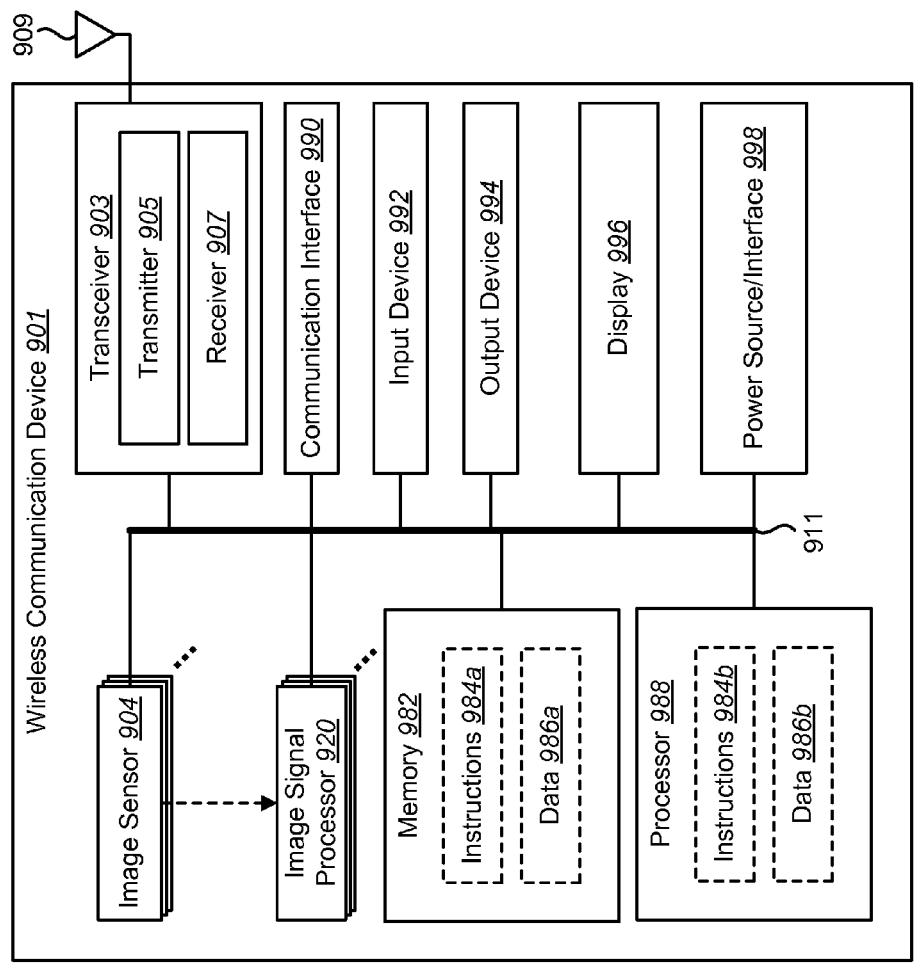
FIG. 9 illustrates various components that may be utilized in a wireless communication device.

FIG. 9 illustrates various components that may be utilized in a wireless communication device 901. The wireless communication device 901 may be a kind of electronic device 102, 802 used to wirelessly communicate with other electronic devices. Examples of wireless communication devices 901 include cellular telephones, smart phones, Personal Digital Assistants (PDAs), e-readers, gaming systems, music players, netbooks, wireless modems, laptop computers, tablet devices, etc. The electronic device 102 discussed in relation to FIG. 1 may be configured similarly to the wireless communication device 901.

Many of the components included in the wireless communication device 901 may be configured and function similarly to the components described in relation to FIG. 8. For example, the wireless communication device may include one or more image sensors 904, two or more image signal processors 920, memory 982 including instructions 984a and/or data 986a, a processor 988 loading instructions 984b and/or data 986b from memory 982, one or more communication interfaces 990, one or more input devices 992, one or more output devices 994, such as a display device 996 and a power source/interface 998. The wireless communication device 901 may additionally include a transmitter 905 and a receiver 907. The transmitter 905 and receiver 907 may be jointly referred to as a transceiver 903. The transceiver 903 may be coupled to one or more antennas 909 for transmitting and/or receiving wireless signals. Similar to the electronic device 802 described above in relation to FIG. 8, the wireless communication device 901 may include one or more buses illustrated as a bus system 911 in FIG. 9. The bus system 911 may couple the described components together, allowing coordinated operation.

As used herein, the term "wireless communication device" generally denotes an electronic device (e.g., access terminal, client device, client station (STA) etc.) that may wirelessly connect to another electronic device (e.g., base station). A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards such as the $3^{rd}$ Generation Partnership Project (3GPP). Thus, the general term "wireless communication device" may include wireless communication devices described with varying nomenclatures according to industry standards (e.g., access terminal, user equipment (UE), remote terminal, etc.).

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An electronic device for parallel image processing using multiple processors, comprising:
    a plurality of image sensors for providing image data;
    a multiple processor interface for determining whether it is beneficial to segment the image data and for segmenting the image data to produce segmented image data;
    a plurality of processors for processing the segmented image data to produce processed segmented image data, wherein each processor of the plurality of processors is dedicated to one of the plurality of image sensors, and wherein each processor processes image data only from an image sensor that each processor is dedicated to if the multiple processor interface determines that it is not beneficial to segment the image data; and
    wherein the multiple processor interface dynamically adjusts a number of the plurality of processors used to process the segmented image data; and wherein the multiple processor interface maps the segmented image data to the number of the plurality of processors and synchronizes the segmented image data to clock rates of the number of the plurality of processors.

2. The electronic device of claim 1, further comprising a combining module for combining the processed segmented image data to produce a processed image.

3. The electronic device of claim 1, wherein at least one processor of the plurality of processors processes segmented image data from at least one image sensor that the at least one processor is not dedicated to.

4. The electronic device of claim 1, wherein the multiple processor interface dynamically adds processors for image data processing from the plurality of processors.

5. The electronic device of claim 4, wherein dynamically adding processors for image data processing is based on a workload.

6. The electronic device of claim 1, wherein the multiple processor interface determines that it is beneficial to segment the image data if the image data can be processed more rapidly if it is segmented.

7. The electronic device of claim 1, wherein the multiple processor interface determines that it is beneficial to segment the image data if at least one of the plurality of processors is individually incapable of processing the image data.

8. The electronic device of claim 1, wherein the multiple processor interface determines that it is beneficial to segment the image data if the image data can be processed using less power if it is segmented.

9. The electronic device of claim 1, wherein the multiple processor interface determines a mapping to map the image data to the plurality of processors.

10. The electronic device of claim 1, wherein the multiple processor interface determines a segmentation of the image data.

11. The electronic device of claim 1, wherein at least one of the plurality of processors has a different capability from another of the plurality of processors.

12. The electronic device of claim 1, wherein at least one of the plurality of image sensors has a different capability from another of the plurality of image sensors.

13. The electronic device of claim 1, wherein the plurality of processors are individually incapable of processing the image data.

14. The electronic device of claim 1, wherein segments of the segmented image data overlap.

15. The electronic device of claim 1, wherein the plurality of processors process the segmented image data in real time and in parallel.

16. The electronic device of claim 1, wherein the electronic device is a wireless communication device.

17. The electronic device of claim 1, wherein the plurality of processors are image signal processors (ISPs).

18. The electronic device of claim 1, wherein the electronic device streams the image data such that the image data is not stored before processing.

19. The electronic device of claim 2, wherein the combining module comprises an output buffer.

20. The electronic device of claim 2, wherein the combining module comprises an output interface and an output buffer.

21. A method for parallel image processing using multiple processors, comprising:
    providing image data to an electronic device using a plurality of image sensors;
    mapping the image data to a plurality of processors, wherein each processor is dedicated to one of the plurality of image sensors, and wherein a number of processors of the plurality of processors used to process the image data is dynamically adjusted;
    determining whether it is beneficial to segment the image data;
    wherein if it is determined to be not beneficial to segment the image data, each processor processes image data only from an image sensor that each processor is dedicated to; and
    wherein if it is determined to be beneficial to segment the image data, the method further comprises:
        segmenting the image data to produce segmented image data;
        synchronizing the segmented image data to clock rates of the plurality of processors; and
        processing the segmented image data to produce processed segmented image data.

22. The method of claim 21, further comprising combining the processed segmented image data to produce a processed image.

23. The method of claim 21, wherein at least one processor of the plurality of processors processes segmented image data from at least one image sensor that the at least one processor is not dedicated to.

24. The method of claim 21, wherein the electronic device dynamically adds processors for image data processing from the plurality of processors.

25. The method of claim 24, wherein dynamically adding processors for image data processing is based on a workload.

26. The method of claim 21, wherein determining whether it is beneficial to segment the image data is based on whether the image data can be processed more rapidly if it is segmented.

27. The method of claim 21, wherein determining whether it is beneficial to segment the image data is based on whether at least one of the plurality of processors is individually incapable of processing the image data.

28. The method of claim 21, wherein determining whether it is beneficial to segment the image data is based on whether the image data can be processed using less power if it is segmented.

29. The method of claim 21, further comprising determining a mapping for mapping the image data to the plurality of processors.

30. The method of claim 21, further comprising determining a segmentation of the image data.

31. The method of claim 21, wherein at least one of the plurality of processors has a different capability from another of the plurality of processors.

32. The method of claim 21, wherein at least one of the plurality of image sensors has a different capability from another of the image sensors.

33. The method of claim 21, wherein the plurality of processors are individually incapable of processing the image data.

34. The method of claim 21, wherein the segmented image data overlaps.

35. The method of claim 21, wherein processing the segmented image data is done in real time and in parallel.

36. The method of claim 21, wherein the electronic device is a wireless communication device.

37. The method of claim 21, wherein the plurality of processors are image signal processors (ISPs).

38. The method of claim 21, further comprising streaming the image data such that the image data is not stored before processing.

39. The method of claim 22, wherein the processed segmented image data is combined using an output buffer.

40. The method of claim 22, wherein the processed segmented image data is combined using an output interface and an output buffer.

41. A computer-program product for parallel image processing using multiple processors, the computer-program product comprising a non-transitory computer-readable medium having instructions thereon, the instructions comprising:
  code for providing image data using a plurality of image sensors;
  code for mapping the image data to the plurality of processors, wherein each processor is dedicated to one of the plurality of image sensors, and wherein a number of processors of the plurality of processors used to process the image data is dynamically adjusted;
  code for determining whether it is beneficial to segment the image data, wherein if it is determined to be not beneficial to segment the image data, each processor processes image data only from an image sensor that each processor is dedicated to; and
  wherein if it is determined to be beneficial to segment the image data, the instructions further comprise:
    code for segmenting the image data to produce segmented image data;
    code for synchronizing the segmented image data to clock rates of the plurality of processors; and
    code for processing the segmented image data to produce processed segmented image data.

42. The computer-program product of claim 41, wherein at least one processor of the plurality of processors processes segmented image data from at least one image sensor that the at least one processor is not dedicated to.

43. The computer-program product of claim 41, further comprising code for dynamically adding processors for image data processing from the plurality of processors.

44. The computer-program product of claim 43, wherein dynamically adding processors for image data processing is based on a workload.

45. An apparatus for parallel image processing using multiple processors, comprising:
  means for providing image data using a plurality of image sensors;
  means for mapping the image data to the plurality of processors, wherein each processor is dedicated to one of the plurality of image sensors, and wherein a number of processors of the plurality of processors used to process the image data is dynamically adjusted;
  means for determining whether it is beneficial to segment the image data, wherein if it is determined to be not beneficial to segment the image data, each processor processes image data only from an image sensor that each processor is dedicated to; and
  wherein if it is determined to be beneficial to segment the image data, the apparatus further comprises:
    means for segmenting the image data to produce segmented image data;
    means for synchronizing the segmented image data to clock rates of the plurality of processors; and
    means for processing the segmented image data to produce processed segmented image data.

46. The apparatus of claim 45, wherein at least one processor of the plurality of processors processes segmented image data from at least one image sensor that the at least one processor is not dedicated to.

47. The apparatus of claim 45, further comprising means for dynamically adding processors for image data processing from the plurality of processors.

48. The apparatus of claim 47, wherein the means for dynamically adding processors for image data processing is based on a workload.

* * * * *